United States Patent
Nakayama et al.

(10) Patent No.: US 10,618,185 B2
(45) Date of Patent: Apr. 14, 2020

(54) CONNECTION STRUCTURE (71) Applicant: FANUC CORPORATION, Yamanashi (JP)

(72) Inventors: Kazutaka Nakayama, Yamanashi (JP); Kenichirou Abe, Yamanashi (JP); Masahiro Morioka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 171 days.

(21) Appl. No.: 15/817,736

(22) Filed: Nov. 20, 2017

(65) Prior Publication Data

US 2018/0147734 A1 May 31, 2018

(30) Foreign Application Priority Data

Nov. 28, 2016 (JP) .................. 2016-230676

(51) Int. Cl.
*B25J 19/00* (2006.01)
*B25J 18/00* (2006.01)
(Continued)

(52) U.S. Cl.
CPC ......... *B25J 19/0029* (2013.01); *B25J 9/0012* (2013.01); *B25J 17/00* (2013.01); *B25J 18/00* (2013.01); *F16B 7/18* (2013.01)

(58) Field of Classification Search
CPC . B25J 18/00; B25J 18/02; B25J 9/0012; B25J 9/06; B25J 9/08; B25J 19/00; B25J 19/0029
See application file for complete search history.

(56) References Cited

U.S. PATENT DOCUMENTS 8,245,592 B2* 8/2012 Pan ................. B25J 9/0009
411/372.5
8,849,455 B2* 9/2014 Izumi .............. B25J 9/1641
700/245
(Continued)

FOREIGN PATENT DOCUMENTS

CN 103802132 A 5/2014
CN 104647396 A 5/2015
(Continued)

OTHER PUBLICATIONS

Decision to Grant a Patent dated Jun. 26, 2018, for Japanese Patent Application No. 2016-230676.
(Continued)

*Primary Examiner* — Jonathan P Masinick
(74) *Attorney, Agent, or Firm* — Karceski IP Law, PLLC (57) ABSTRACT

A connection structure in which a robot link member including a first wall, a second wall facing the first wall with an interval, and a connecting wall connecting the first wall and the second wall is connected with a member to be connected contacting a surface of the first wall of the link member, which does not face the second wall, the connection structure includes a bolt penetrating the first and second walls and including a head part contacting the second wall and a screw part screwed into the member to be connected, and a deformation preventing member sandwiched between the first and second walls by tightening the bolt to prevent or reduce deformation of the walls in a direction in which the walls become closer to each other.

10 Claims, 10 Drawing Sheets

(51) Int. Cl.
  *B25J 9/00* (2006.01)
  *B25J 17/00* (2006.01)
  *F16B 7/18* (2006.01)

(56) References Cited

U.S. PATENT DOCUMENTS

| | | | |
|---|---|---|---|
| 2006/0201275 A1 | 9/2006 | Ono | |
| 2011/0154937 A1* | 6/2011 | Liu | B25J 19/00 74/490.05 |
| 2012/0210816 A1* | 8/2012 | Izumi | B25J 9/1005 74/490.03 |
| 2014/0338490 A1 | 11/2014 | Shinabe | |
| 2015/0273701 A1* | 10/2015 | Ting | B25J 18/00 74/519 |
| 2015/0273702 A1 | 10/2015 | Ting et al. | |
| 2016/0214261 A1 | 7/2016 | Davis et al. | |
| 2017/0182669 A1* | 6/2017 | Bordegnoni | B25J 9/044 |
| 2017/0239810 A1* | 8/2017 | Bordegnoni | B25J 9/042 |
| 2017/0291314 A1 | 10/2017 | Hosek et al. | |
| 2018/0104832 A1 | 4/2018 | Hosek et al. | |

FOREIGN PATENT DOCUMENTS

| | | |
|---|---|---|
| EP | 1671756 A1 | 6/2006 |
| EP | 2808132 A1 | 12/2014 |
| JP | S61214994 A | 9/1986 |
| JP | H0721483 U | 4/1995 |
| JP | H07112379 | 5/1995 |
| JP | H07328982 | 12/1995 |
| JP | 2001162578 | 6/2001 |
| JP | 2002248940 | 9/2002 |
| JP | 2006167863 | 6/2006 |
| JP | 2008302490 | 12/2008 |
| JP | 2009280004 | 12/2009 |
| JP | 2010149214 | 7/2010 |
| JP | 2011011346 | 1/2011 |
| JP | 2013099826 | 5/2013 |
| JP | 2013223923 A | 10/2013 |
| JP | 2014226738 | 12/2014 |
| WO | 2017180607 A1 | 10/2017 |
| WO | 2018040541 A1 | 3/2018 |

OTHER PUBLICATIONS

Chinese Office Action dated Sep. 17, 2018, for Chinese Patent Application No. 201711164392.5.
German Office Action dated May 13, 2019, for German Patent Application No. DE 102017127261.5.

* cited by examiner

CONNECTION STRUCTURE

CROSS-REFERENCE TO RELATED APPLICATIONS

This application is based on and claims priority to Japanese Patent Application No. 2016-230676 filed on Nov. 28, 2016, the entire content of which is incorporated herein by reference.

FIELD OF THE INVENTION

The present invention relates to a connection structure connecting a robot link member and a member to be connected so that the member to be connected contacts an outer surface of one of two facing walls of the link member, and relates to, for example, the connection structure connecting the link member and the member to be connected, in which the two walls are parallel to a link attachment surface of an output shaft of a reducer.

BACKGROUND OF THE INVENTION

In a known connection structure, an output shaft of a reducer is connected with one end side of a hollow link member having a rectangular cross section shape and including first and second walls facing each other and a pair of connecting walls connecting the first and second walls (refer to Japanese Unexamined Patent Application, Publication No. 2006-167863, for example). In this structure, the output shaft of the reducer is connected with the link member so that the output shaft of the reducer has surface contact with an outer surface of the first wall of the link member. In this connection structure, a space inside the hollow link member is used for disposition of pipes and wires.

The use of the inside of the hollow link member for disposition of pipes and wires is also disclosed in other known literatures (refer to Japanese Unexamined Patent Application, Publication No. H07-328982, for example).

A known connecting member that connects an arm with an output shaft of an actuator such as a motor includes a plate-like primary member fixed to the output shaft of the actuator, and a ring-shaped auxiliary member connected to the periphery of a hole provided at an end part of the primary member (refer to Japanese Unexamined Patent Application, Publication No. 2014-226738, for example).

SUMMARY OF THE INVENTION

A connection structure according to an aspect of the present invention is a connection structure in which a robot link member including a first wall extending in a predetermined direction, a second wall extending in the predetermined direction and facing the first wall with an interval in a thickness direction of the first wall, and a connecting wall extending in the predetermined direction and connecting the first and second walls is connected with a member to be connected so that a surface of the first wall of the link member comes into contact with the member to be connected, wherein the surface does not face the second wall, the connection structure comprising: a bolt penetrating the first and second walls and including a head part that comes into contact with the second wall and a screw part that is screwed into the member to be connected; and a deformation preventing member disposed near the bolt between the first and second walls and sandwiched between the first and second walls by tightening the bolt so that the deformation preventing member prevents or reduces deformation of the first and second walls in a direction in which the first and second walls become closer to each other.

DESCRIPTION OF EMBODIMENTS OF THE INVENTION

The following is an explanation of a connection structure according to an embodiment of the present invention with reference to the accompanying drawings.

Figure 2:
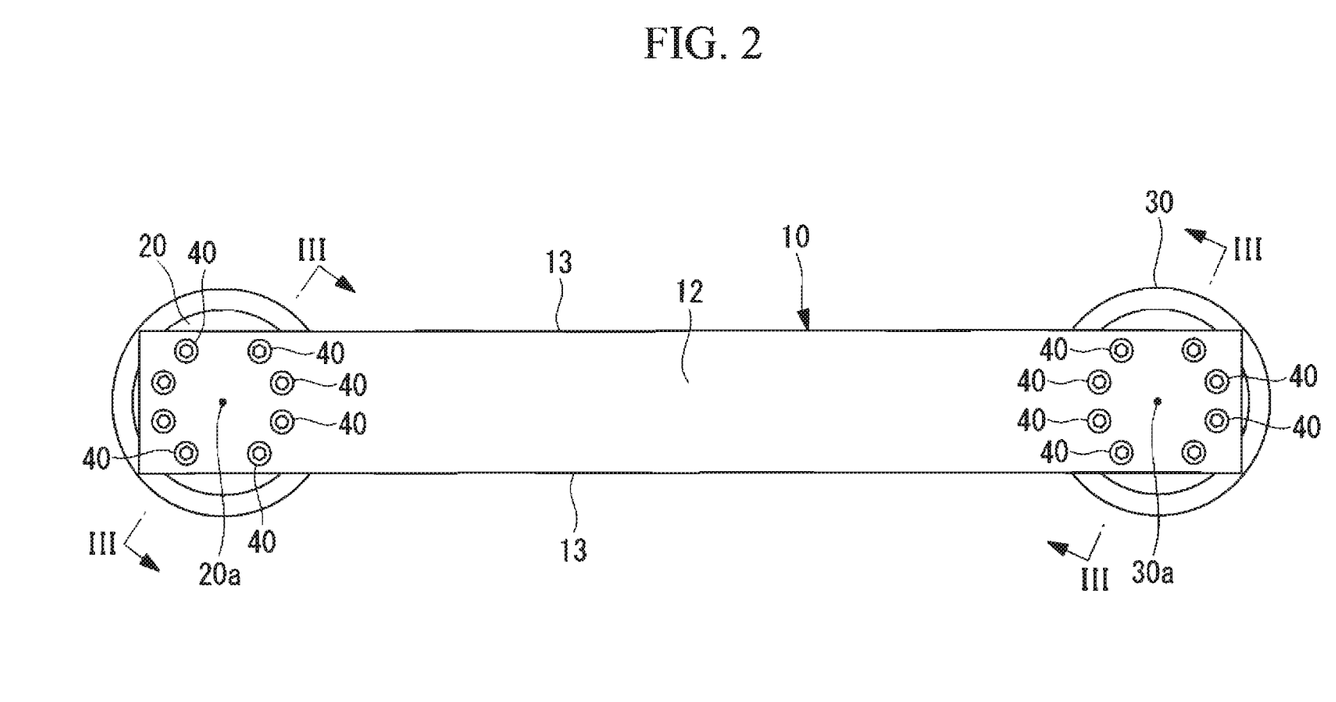
FIG. 2 is a plan view of the link member and members to be connected by using the connection structure according to the present embodiment.

As illustrated in FIG. 2, a connection structure according to the present embodiment connects a member to be connected 20 with one end of a link member 10 in a longitudinal direction, and connects a member to be connected 30 with the other end of the link member 10 in the longitudinal direction. The link member 10 is a tubular member made of metal such as aluminum or aluminum alloy and manufactured by extrusion molding to have a rectangular cross section shape.

Figure 1:
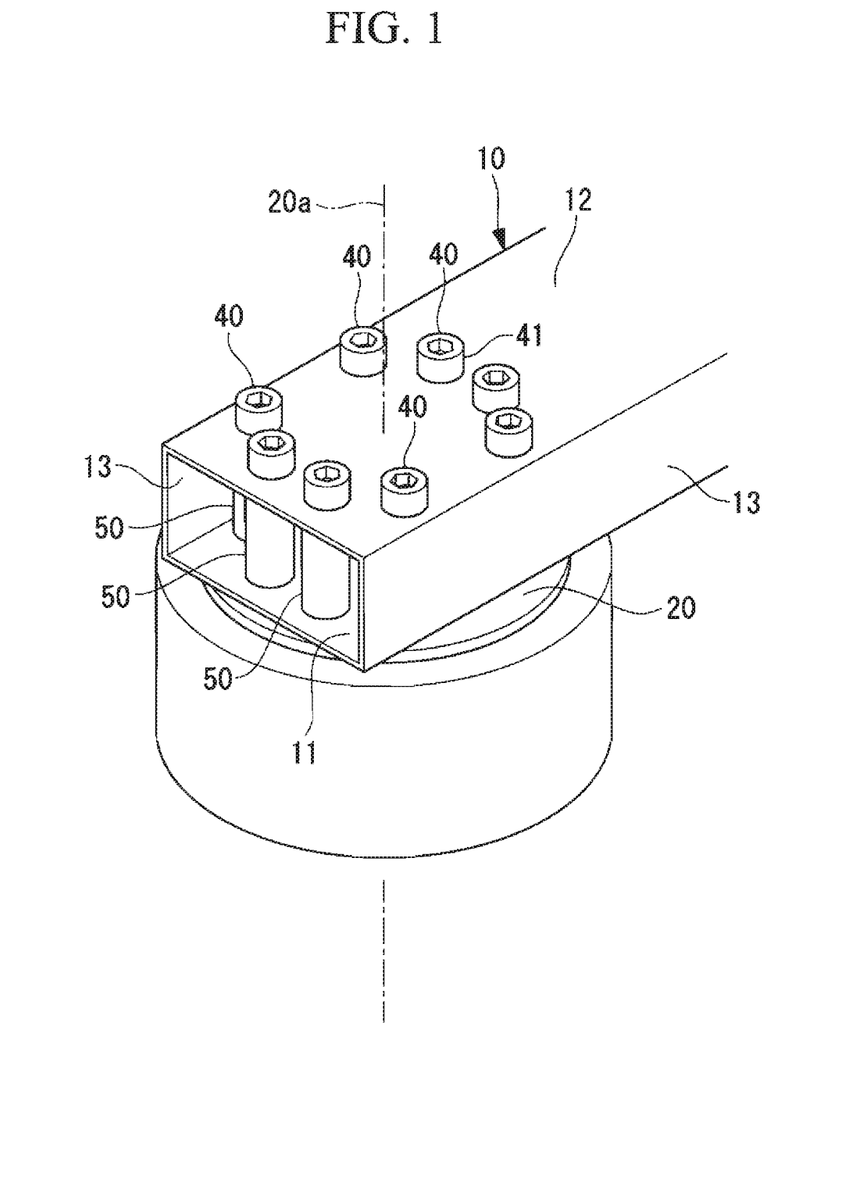
FIG. 1 is an essential perspective view of a link member and a member to be connected with each other by using a connection structure according to an embodiment of the present invention.
Figure 5:
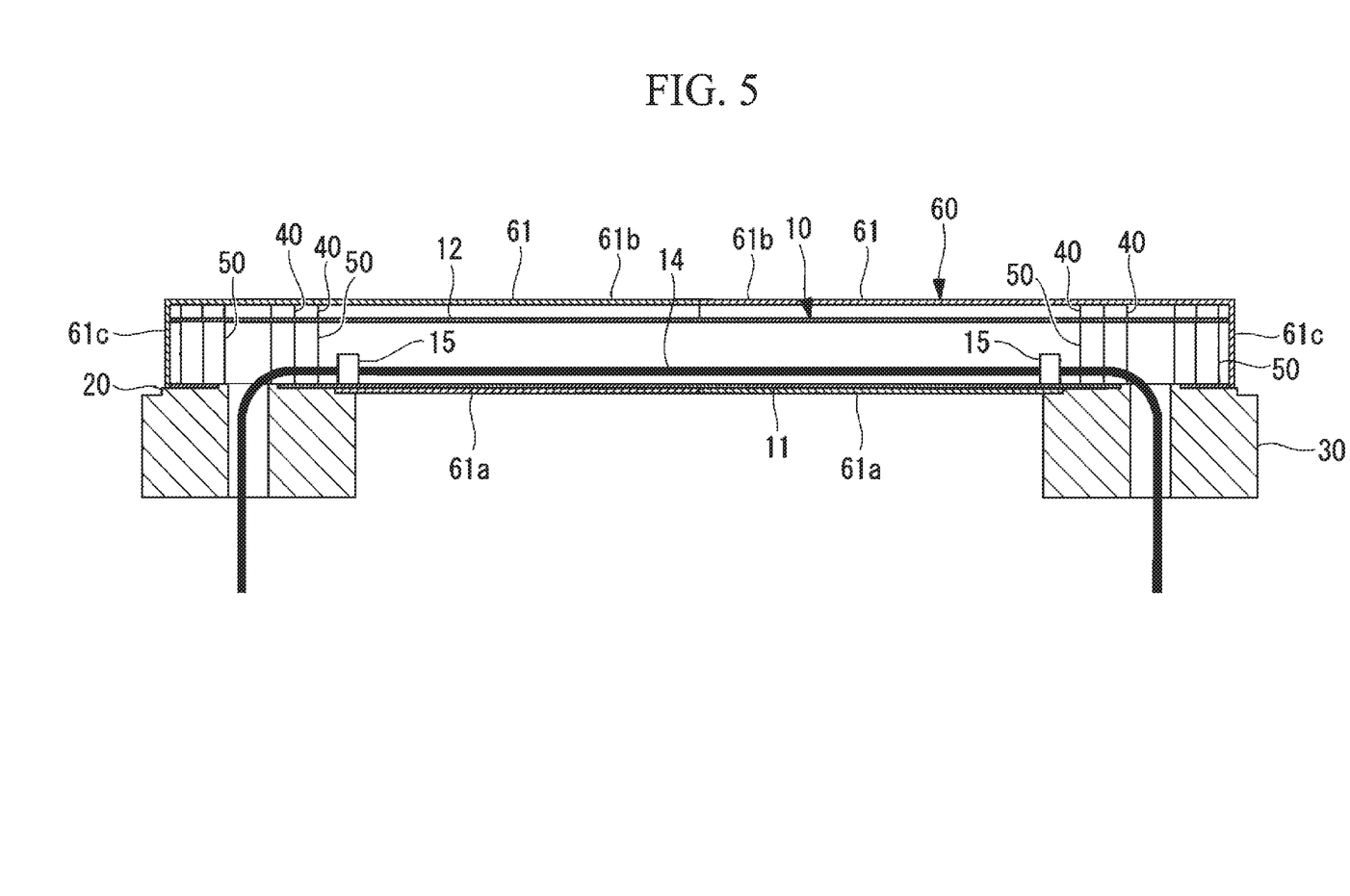
FIG. 5 is a sectional view taken along line V-V in FIG. 4.

As illustrated in, for example, FIGS. 1 and 5, and other drawings, the link member 10 includes a lower wall 11 extending in the longitudinal direction and contacting the member to be connected 20 and the member to be connected 30, an upper wall 12 extending in the longitudinal direction and facing the lower wall 11 with an interval in the thickness direction of the lower wall 11, and a pair of connecting walls 13 connecting the lower wall 11 and the upper wall 12.

In the present embodiment, the member to be connected 20 is an output shaft of a reducer to be driven by an actuator such as a motor, and the member to be connected 30 is a driven shaft rotatably mounted on a driven member such as a slider. In other words, the link member 10 and the members to be connected 20 and 30 are part of a robot. When the member to be connected 20 rotates through actuation by the actuator, the force of the rotation is transferred to the link member 10 so that the link member 10 rotates about a central axis 20a of the member to be connected 20, and the driven member moves together with the member to be connected 30 in response to the rotation of the link member 10. Alternatively, the driven member may be configured to rotate about a central axis 30a of the member to be connected 30.

Note that the member to be connected 30 may be an output shaft of a reducer driven by an actuator. Alternatively, both of the member to be connected 20 and the member to be connected 30 may be driven shafts rotatably mounted on a driven member.

Figure 3:
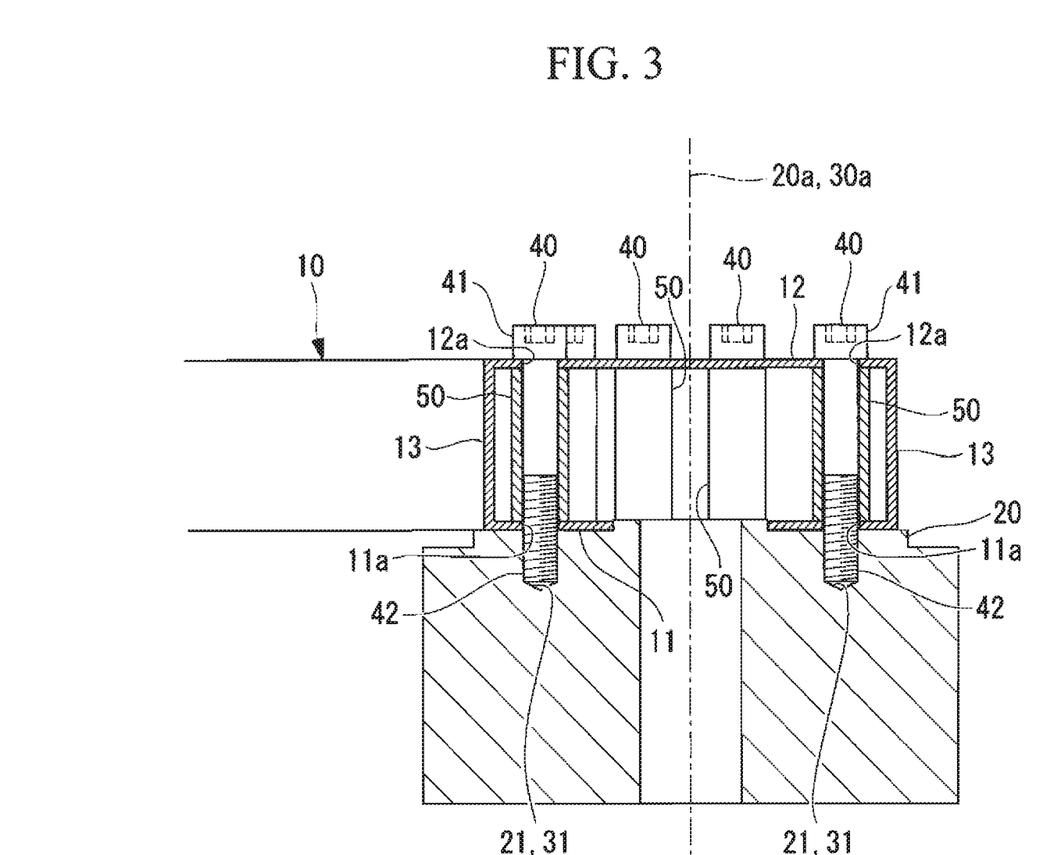
FIG. 3 is a sectional diagram taken along line III-III in FIG. 2.

As illustrated in FIGS. 1 to 3, a connection structure connecting the member to be connected 20 with the one end of the link member 10 includes a plurality of bolts 40 and a plurality of deformation preventing members 50. The bolts 40 penetrate the upper wall 12 and the lower wall 11 in a plate thickness direction, and each include a head part 41 that has contact with the upper wall 12 from the outside of the link member 10, and a screw part 42 that is screwed into a female screw hole 21 of the member to be connected 20. The deformation preventing members 50 are disposed between the upper wall 12 and the lower wall 11. The respective bolts 40 are inserted into the deformation preventing members 50.

Similarly, a connection structure connecting the member to be connected 30 with the other end of the link member 10 includes the bolts 40 and the deformation preventing members 50. The bolts 40 penetrate the upper wall 12 and the lower wall 11 in the plate thickness direction, and each include the head part 41 that has contact with the upper wall 12 from the outside of the link member 10 and the screw part 42 that is screwed into a female screw hole 31 of the member to be connected 30. The deformation preventing members 50 are disposed between the upper wall 12 and the lower wall 11. The respective bolts 40 are inserted into the deformation preventing members 50.

Each deformation preventing member 50 is a metallic tubular member (in the present embodiment, a cylindrical member). Thus, the deformation preventing member 50 can be inexpensively manufactured only by cutting a metallic tubular material at a predetermined length. When each bolt 40 being screwed into the female screw holes 21 and 31 is tightened, the axial force of the bolt 40 slightly deforms the link member 10 so that the upper wall 12 and the lower wall 11 become closer to each other, and accordingly, at least part of the deformation preventing members 50 are sandwiched between the upper wall 12 and the lower wall 11. Through the tightening of the bolts 40 in this state, the member to be connected 20 is connected with the one end of the link member 10, and the member to be connected 30 is connected with the other end of the link member 10.

As illustrated in FIG. 5, an actuator pipe and wire 14 are disposed in the link member 10 and fixed to, for example, the lower wall 11 of an inner peripheral surface of the link member 10 by a fixing member 15. For example, the pipe and wire 14 are placed between the lower wall 11 and a central part of the fixing member 15 in a longitudinal direction thereof, and both ends of the fixing member 15 in the longitudinal direction are fixed to the lower wall 11 by a fastening member such as a part with screw.

In the present embodiment, the fixing members 15 are provided near the deformation preventing members 50 at the one end of the link member 10 in the longitudinal direction and near the deformation preventing members 50 at the other end of the link member 10 in the longitudinal direction. Each fixing member 15 is fixed to the lower wall 11 at a position near an end of the link member 10, which makes it easy to perform the fixation.

The upper wall 12 may be provided with a hole for facilitating the fixation of the fixing member 15.

Figure 4:
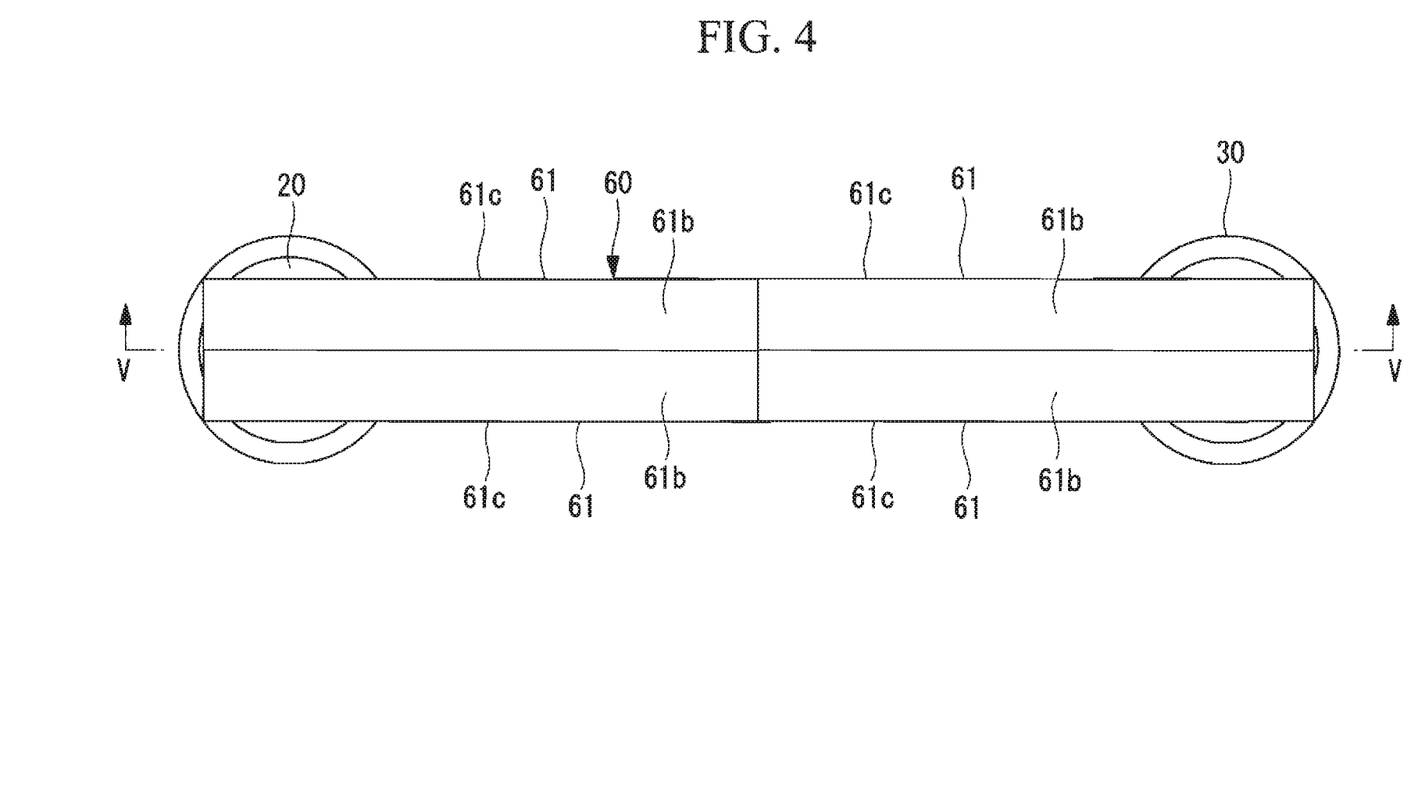
FIG. 4 is a plan view of the link member and the members to be connected by using the connection structure according to the present embodiment.

As illustrated in FIGS. 4 and 5, the outer surface of the link member 10 is covered by a cover member 60. The cover member 60 includes a plurality of cover components 61. Each cover component 61 includes a lower-wall covering part 61a contacting the lower wall 11 from the outside of the link member 10, an upper-wall covering part 61b contacting the upper wall 12 from the outside of the link member 10, and a connecting wall covering part 61c connecting the lower-wall covering part 61a and the upper-wall covering part 61b. The cover component 61 is made of plastic or a material having rubber-like elastic characteristics such as rubber or foamed rubber. In the present embodiment, the outer surface of the link member 10 is mostly covered by the cover member 60 except for surfaces that has contact with the members to be connected 20 and 30.

The cover member 60 is not limited to the above-described configuration. Note that the cover member 60 may have a configuration in which two components having identical shapes are symmetrically disposed to cover the outer surface of the link member 10.

According to the present embodiment, when the bolts 40 are tightened, the deformation preventing members 50 disposed near the bolts 40 are sandwiched between the lower wall 11 (first wall) and the upper wall 12 (second wall) to prevent or reduce deformation of the lower wall 11 and the upper wall 12 in a direction in which the lower wall 11 and the upper wall 12 become closer to each other. Accordingly, the axial force of each bolt 40 is applied to both of the lower wall 11 and the upper wall 12.

With this configuration, when force is transferred from the member to be connected 20 to the link member 10 or when force is transferred from the link member 10 to the member to be connected 30, force is transferred between the lower wall 11 and the members to be connected 20 and 30 and also between the upper wall 12 and the members to be connected 20 and 30 through the deformation preventing members 50. Thus, deformation of the link member 10 can be reduced when a load is applied to the link member 10 based on the force transfer between the link member 10 and the members to be connected 20 and 30. In addition, the bolts 40 can be easily fastened because the head parts 41 of the bolts 40 have contact with the upper wall 12.

Since the link member 10 is a tubular member manufactured by extrusion molding to have a rectangular cross section shape, by providing holes 11a and 12a for inserting the bolts 40 in the upper wall 12 and the lower wall 11 of the link member 10 which is obtained by cutting a tubular material at a predetermined length, and by disposing the deformation preventing members 50 in the link member 10 and then tightening the bolts 40 to the members to be connected 20 and 30, the link member 10 can be connected with the members to be connected 20 and 30.

Since the pipe and wire 14 are fixed to the inner peripheral surface of the link member 10 by the fixing member 15, relative movement is effectively prevented between the link member 10 and the pipe and wire 14 when the link member 10 is moved by the actuator, which is advantageous for preventing damage on the pipe and wire 14. The fixing member 15 may be a plastic clamping band. In a case of using the clamping band, the pipe and wire 14 are lightly tightened by the clamping band being inserted through two holes provided to the lower wall 11.

The outer surface of the link member 10 is covered by the cover member 60 made of a material softer than that of the link member 10. With this configuration, a part covered by the cover member 60 has a surface softer than the link member 10, and the appearance of the surface can be adjusted by selecting, for example, the color and shape of the cover member 60.

The link member 10 is made of aluminum or aluminum alloy. This configuration is advantageous for achieving reduction of the weight of the link member 10 while maintaining the strength thereof.

Figure 6:
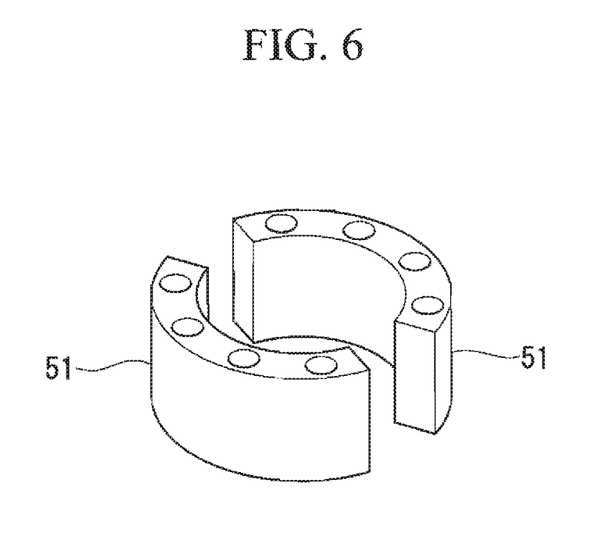
FIG. 6 is a perspective view of a deformation preventing member used in a connection structure according to a first modification of the present embodiment.
Figure 7:
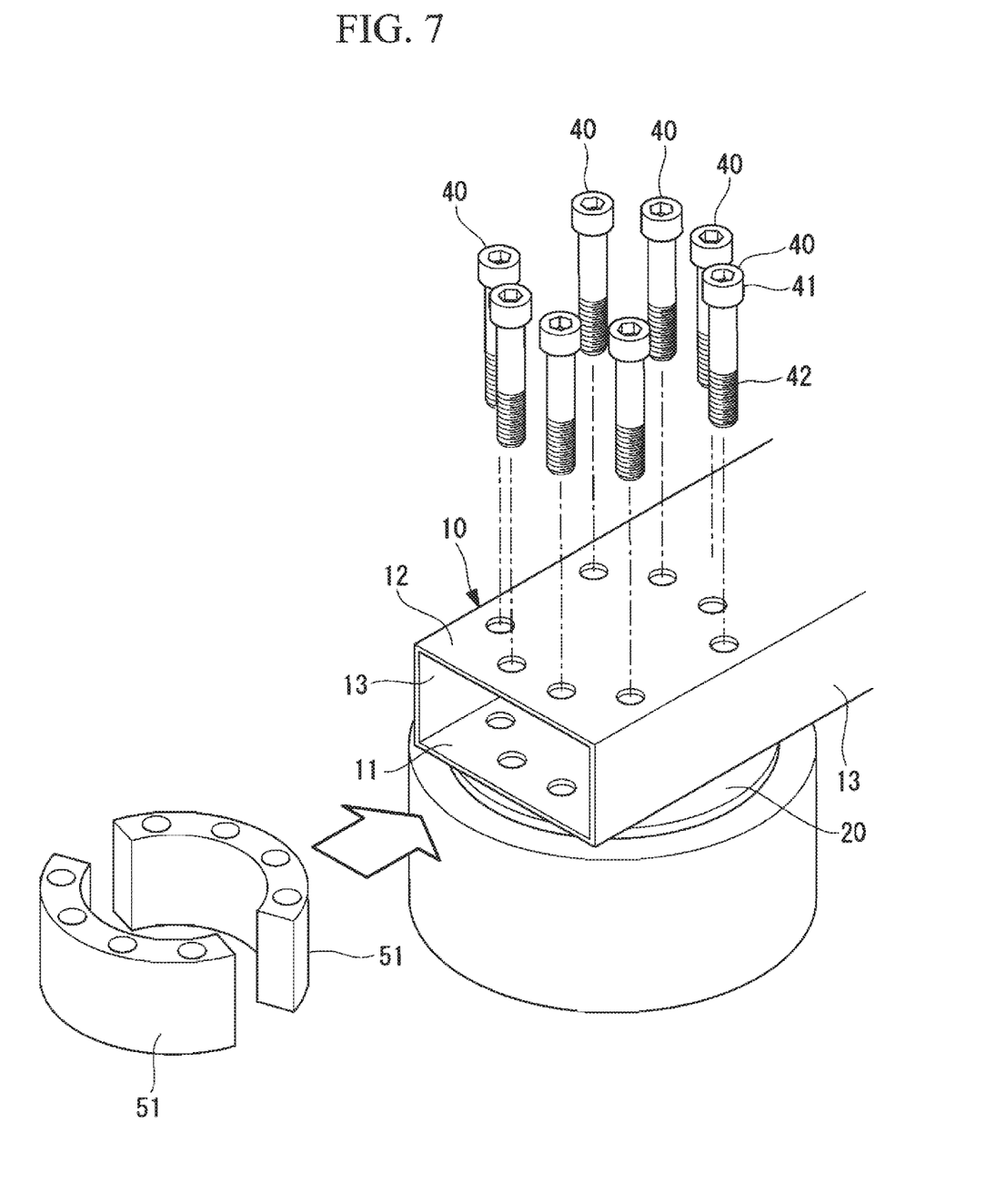
FIG. 7 is an essential perspective view of the link member and the member to be connected by using the connection structure according to the first modification of the present embodiment.

In the above-described embodiment, the bolts 40 are inserted into the respective deformation preventing members 50. However, the deformation preventing members 50 may be replaced with deformation preventing members 51 into each of which a plurality of the bolts 40 are inserted as illustrated in FIGS. 6 and 7. In this case, effects which are the same as those of the case with the deformation preventing members 50 are achieved. Gaps formed among the plurality of the deformation preventing members 51 can be used as spaces into which the pipe and wire 14 are inserted.

Figure 8:
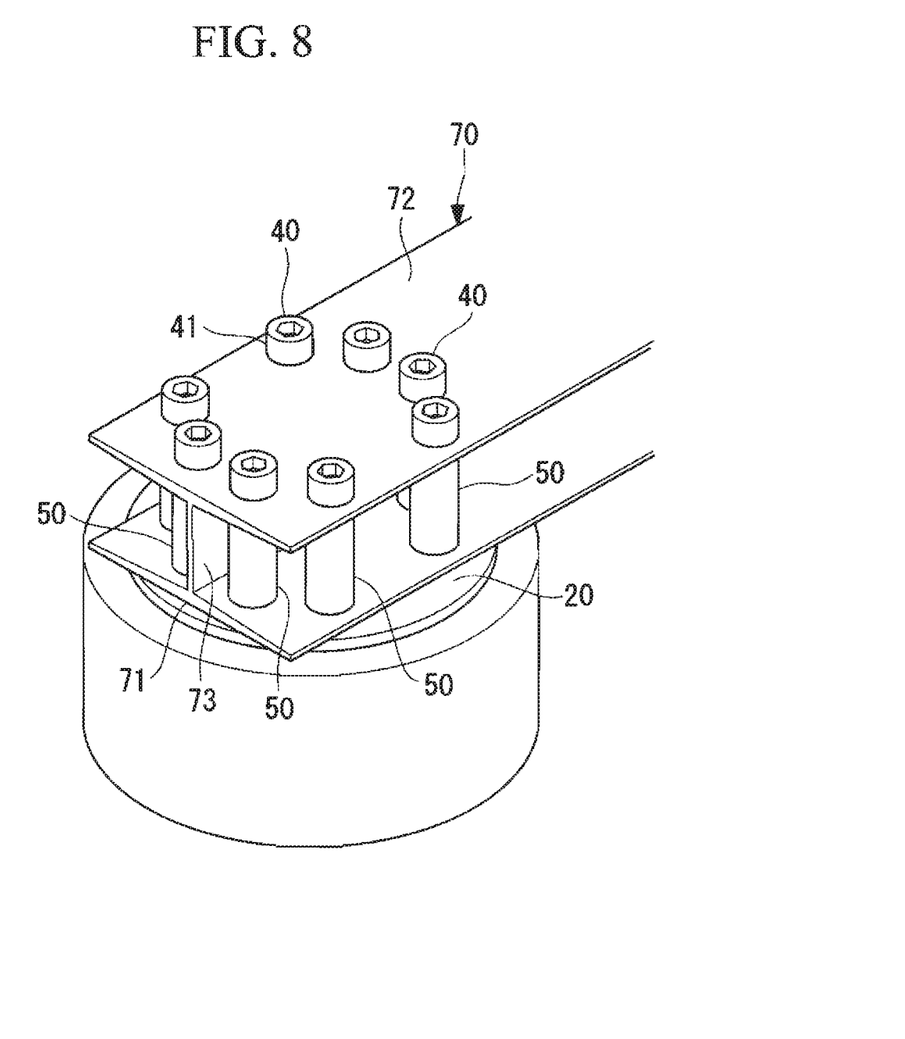
FIG. 8 is an essential perspective view of a link member and the member to be connected by using a connection structure according to a second modification of the present embodiment.

In the above-described embodiment, the link member 10 made of a tubular member having a rectangular cross section shape is used. However, the link member 10 may be replaced with a link member 70 manufactured by extrusion molding to have an H-shaped cross section as illustrated in FIG. 8. In this case, the link member 70 includes a lower wall 71 which has surface contact with the member to be connected 20 and the member to be connected 30, an upper wall 72 extending in the longitudinal direction and facing the lower wall 71 with an interval in a thickness direction of the lower wall 71, and a connecting wall 73 connecting the lower wall 71 and the upper wall 72.

Figure 9:
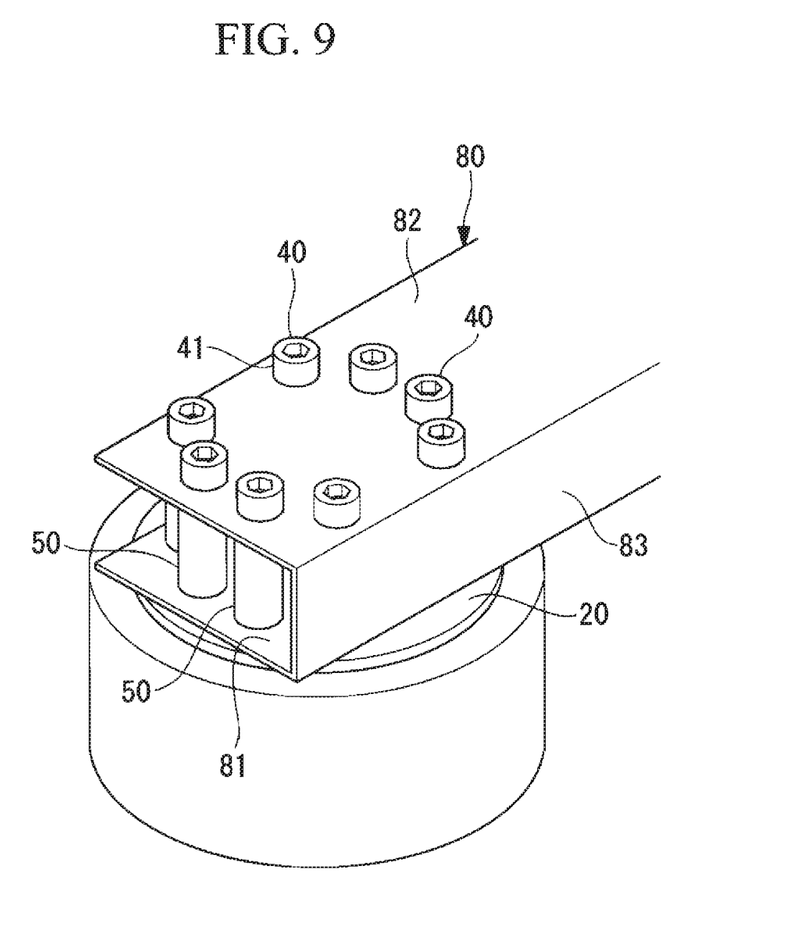
FIG. 9 is an essential perspective view of a link member and a member to be connected by using the connection structure according to a third modification of the present embodiment.

Further, the link members 10 and 70 may be replaced with a link member 80 manufactured by extrusion molding to have a substantially U-shaped cross section as illustrated in FIG. 9. In this case, the link member 80 includes a lower wall 81 which has surface contact with the member to be connected 20 and the member to be connected 30, an upper wall 82 extending in the longitudinal direction and facing the lower wall 81 with an interval in a thickness direction of the lower wall 81, and a connecting wall 83 connecting the lower wall 81 and the upper wall 82.

In these cases, when the bolts 40 being screwed into the female screw holes 21 and 31 are tightened, the axial force of each bolt 40 slightly deforms the link member 70 (80) so that the upper wall 72 (82) and the lower wall 71 (81) become closer to each other, and accordingly, the deformation preventing members 50 are sandwiched between the upper wall 72 (82) and the lower wall 71 (81). Through the tightening of the bolts 40 in this state, the member to be connected 20 is connected with one end of the link member 70 (80), and the member to be connected 30 is connected with the other end of the link member 70 (80).

Although the link member 70 (80) having an H-shaped cross section (substantially U-shaped cross section) can be used in this manner, it is preferable to use a link member made of a tubular member having an upper wall and a lower wall, like the link member 10, to achieve the strength and durability of the robot.

It should be understood that the fixing member 15 achieves the same effect when fixed on, for example, any surface in a space between the lower wall 71 and the upper wall 72 (any surface in a space between the lower wall 81 and the upper wall 82) on an inner surface side of the link member 70 (80) having an H-shaped cross section shape (substantially U-shaped cross section shape) illustrated in FIG. 8 (FIG. 9).

It should be also understood that the link member having an H-shaped cross section (substantially U-shaped cross section) illustrated in FIG. 8 (FIG. 9) can be covered by the cover member 60.

In the present embodiment, the link members 10, 70, and 80 are made of aluminum or aluminum alloy. However, the link members 10, 70, and 80 may be each formed of a tubular member manufactured by extrusion molding using another metal such as iron or copper alloy.

Also, the link members 10, 70, and 80 made of plastic may be used. In this case, it is preferable to use plastic having a tensile strength of 49 MPa or higher, such as plastic called engineer plastic or super engineer plastic.

The deformation preventing members 50 (51) may be made of plastic or a connected component of plastic and metal. In this case, it is preferable to use plastic having a tensile strength of 49 MPa or higher, such as plastic called engineer plastic or super engineer plastic. Further, the deformation preventing members 50 (51) may be formed by plastic extrusion molding. With this configuration, the same effects as described above can be achieved as long as deformation of the upper wall 12 (72, 82) and the lower wall 11 (71, 81) when the bolts 40 are tightened is prevented or reduced in a direction in which the upper wall 12 (72, 82) and the lower wall 11 (71, 81) become closer to each other.

The member to be connected 30 may be connected with the other end of the link member 10 so that the member to be connected 30 contacts the upper wall 12 (72, 82) and the head parts 41 of the bolts 40 contact the lower wall 11 (71, 81). In this case, the upper wall 12 (72, 82) serves as the first wall, and the lower wall 11 (71, 81) serves as the second wall. Similarly, the member to be connected 30 may be connected with the other end of the link member 10 so that the member to be connected 30 contacts one of the connecting walls 13 and the head parts 41 of the bolts contact the other connecting wall 13. Alternatively, the one or other end of the link member 10 may be fixed to, for example, an arm or a predetermined support of the robot.

The present invention is described above with reference to the typical embodiments. However, it should be understood that any skilled person in the art could perform the above-described modifications, any other various modifications, omissions, and additions without departing from the scope of the present invention.

In the above-described embodiments, the cover member 60 are composed of the cover components 61, but may be achieved by, for example, urethane foam painting or coating.

Figure 10:
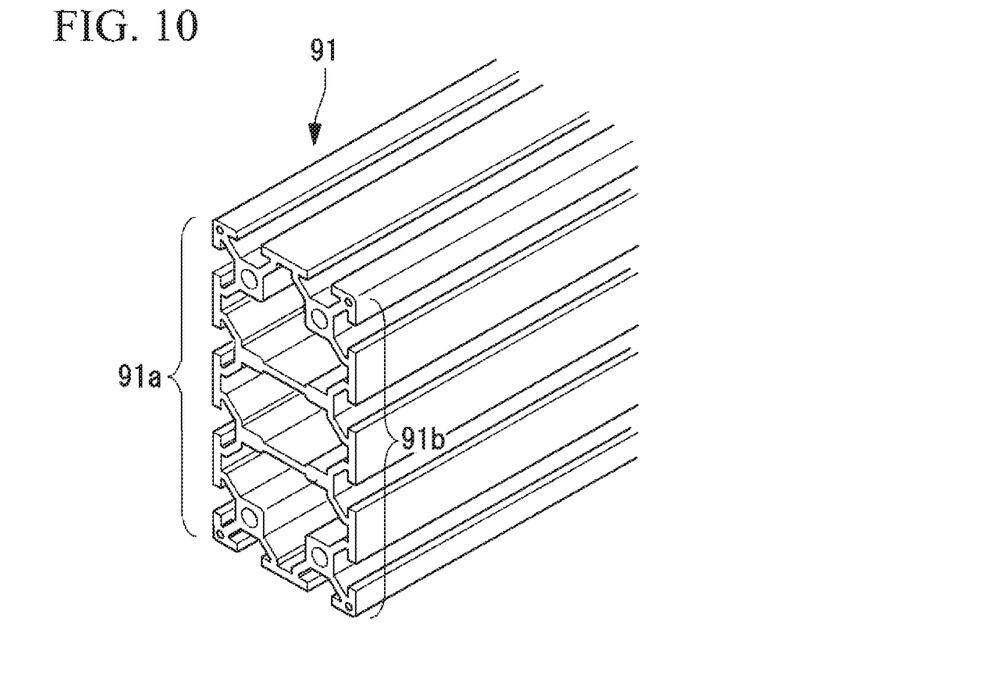
FIG. 10 is a perspective view of a link member used in a connection structure according to a fourth modification of the present embodiment.
Figure 11:
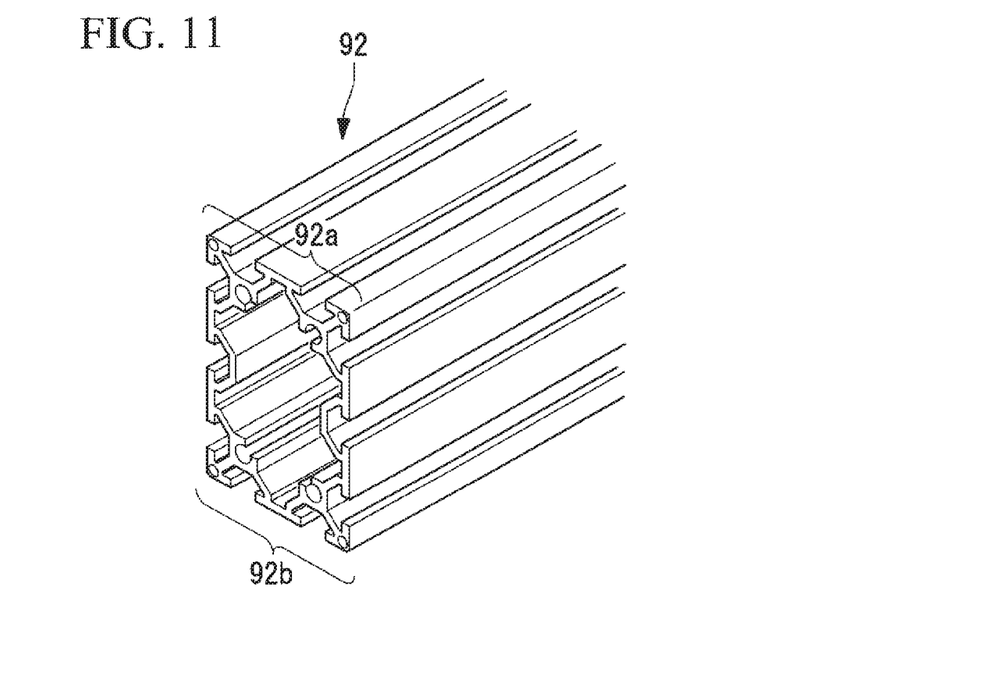
FIG. 11 is a perspective view of a link member used in a connection structure according to a fifth modification of the present embodiment.

Modifications are possible to the sectional shape of a link member. For example, a mold having a sectional shape for making the link member robust against a load in a particular direction may be prepared to produce a link member 91 (92) as illustrated in FIG. 10 (11) by extrusion molding using the mold. In this case, a pair of facing walls of the link member 91 (92) serve as the first and second walls. For example, holes for inserting the bolts 40 are provided in a wall 91*a* (92*a*) of the link member 91 (92) and also provided in a wall 91*b* (92*b*) at positions corresponding to the holes of the wall 91*a* (92*a*). The wall 91*a* (92*a*) serves as the first wall, and the wall 91*b* (92*b*) facing the wall 91*a* (92*a*) serves as the second wall. Alternatively, another pair of facing walls may be used as the first and second walls.

The inventors have arrived at the following aspects of the present invention.

A connection structure according to an aspect of the present invention is a connection structure in which a robot link member including a first wall extending in a predetermined direction, a second wall extending in the predetermined direction and facing the first wall with an interval in a thickness direction of the first wall, and a connecting wall extending in the predetermined direction and connecting the first and second walls is connected with a member to be connected so that a surface of the first wall of the link member comes into contact with the member to be connected, wherein the surface does not face the second wall, the connection structure comprising: a bolt penetrating the first and second walls and including a head part that comes into contact with the second wall and a screw part that is screwed into the member to be connected; and a deformation preventing member disposed near the bolt between the first and second walls and sandwiched between the first and second walls by tightening the bolt so that the deformation preventing member prevents or reduces deformation of the first and second walls in a direction in which the first and second walls become closer to each other.

In this aspect, when the bolt is tightened, the deformation preventing member disposed near the bolt is sandwiched between the first and second walls to prevent or reduce deformation of the first and second walls in a direction in which the first and second walls become closer to each other. Accordingly, the axial force of the bolt is applied to both of the first and second walls. With this configuration, when force is transferred from the member to be connected to the link member or when force is transferred from the link member to the member to be connected, force is transferred between the first wall and the member to be connected, and also between the second wall and the member to be connected through the deformation preventing member.

Thus, deformation of the link member can be reduced when a load is applied to the link member due to the force transfer between the link member and the member to be connected.

The bolt can be easily fastened because the head part of the bolt comes into contact with the second wall.

In the above-described aspect, it is preferable that the link member is a tubular member manufactured by extrusion molding to have a rectangular cross section shape.

In this case, holes for inserting the bolt may be provided to the first and second walls of the link member obtained by cutting a tubular material at a predetermined length, and the link member may be connected with the member to be connected by disposing the deformation preventing member in the link member and then tightening the bolt to the member to be connected. The tubular member manufactured by extrusion molding is lightweight, highly rigid, and inexpensive. Thus, this configuration is advantageous for manufacturing a lightweight and inexpensive robot.

In the above-described aspect, the connection structure may further include a fixing member mounted on any surface in a space between the first and second walls of the link member to fix a pipe and/or a wire. In this case, relative movement is effectively prevented between the link member and the pipe or the wire when the link member is moved, which is advantageous for preventing damage on the pipe or the wire. The fixing member may be a plastic clamping band.

In the above-described aspect, the connection structure may further include a cover member made of a material softer than a material of the link member and covering at least part of an outer surface of the link member.

In this case, a part covered by the cover member has a surface softer than the link member, and the appearance of the surface can be adjusted by selecting the cover member.

In the above-described aspect, it is preferable that the link member is made of aluminum or aluminum alloy. In the above-described aspect, the link member may be made of plastic. These configurations are advantageous for achieving reduction of the weight of the link member while maintaining the strength thereof.

The aforementioned aspects can reduce deformation of a robot link member due to a load when a member to be connected is connected with one of two facing walls of the link member.

The invention claimed is:

1. A connection structure in which a robot link member including a first wall extending in a predetermined direction, a second wall extending in the predetermined direction and facing the first wall with an interval in a thickness direction of the first wall, and a connecting wall extending in the predetermined direction and connecting the first and second walls is connected with a member to be connected so that a surface of the first wall of the link member comes into contact with the member to be connected, wherein the surface does not face the second wall, the connection structure comprising:
   a plurality of bolts, each of which penetrates the first and second walls at an end portion of the robot link member and each of which includes a head part that comes into contact with the second wall and a screw part that is screwed into the member to be connected; and
   a deformation preventing member disposed near the bolts between the first and second walls and sandwiched between the first and second walls by tightening the bolts so that the deformation preventing member prevents or reduces deformation of the first and second walls in a direction in which the first and second walls become closer to each other.

2. The connection structure according to claim 1, wherein the link member is a tubular member manufactured by extrusion molding to have a rectangular cross section shape.

3. The connection structure according to claim 1, further comprising a fixing member mounted on any surface in a space between the first and second walls of the link member to fix at least one of a pipe and a wire.

4. The connection structure according to claim 1, further comprising a cover member made of a material softer than a material of the link member and covering at least part of an outer surface of the link member.

5. The connection structure according to claim 1, wherein the link member is made of at least one of aluminum and an aluminum alloy.

6. The connection structure according to claim 1, wherein the link member is made of plastic.

7. The connection structure according to claim 1, wherein a surface in the thickness direction of the second wall comprises a seat surface for each of the bolts, and the head part of each of the bolts comes into contact with the seat surface when tightening the bolts.

8. The connection structure according to claim 1, wherein the plurality of bolts are arranged in a circumferential direction.

9. The connection structure according to claim 1, wherein the member to be connected is an output shaft of a reducer.

10. The connection structure according to claim 1, wherein the plurality of bolts are located at positions which are different in a direction perpendicular to a longitudinal direction of the robot link member and also in the predetermined direction.

\* \* \* \* \*